US005783927A

United States Patent [19]
Chen

[11] Patent Number: 5,783,927
[45] Date of Patent: Jul. 21, 1998

[54] PORTABLE POWER SUPPLY UNIT PROVIDING BACKUP BATTERY, BATTERY CHARGER, AND UNIVERSAL ADAPTER

[75] Inventor: James Chin-Ming Chen, Tao-Yuan, Taiwan

[73] Assignee: Delta Green Energy, Inc., Hsinchu, Taiwan

[21] Appl. No.: 535,646

[22] Filed: Sep. 28, 1995

[51] Int. Cl.$^6$ .................................................. H01M 10/46
[52] U.S. Cl. ........................................... 320/110; 320/111
[58] Field of Search .............................. 320/2, 5, 6, 15, 320/30, 31, 48

[56] References Cited

U.S. PATENT DOCUMENTS

| | | | |
|---|---|---|---|
| 4,595,872 | 6/1986 | Ball | 320/13 |
| 5,160,879 | 11/1992 | Tortola et al. | 320/2 |
| 5,200,685 | 4/1993 | Sakamoto | 320/2 |
| 5,371,456 | 12/1994 | Brainard | 320/31 |
| 5,477,123 | 12/1995 | Allen et al. | 320/2 |
| 5,483,437 | 1/1996 | Tang | 320/2 X |
| 5,510,691 | 4/1996 | Palatov | 320/2 |

*Primary Examiner*—Edward Tso
*Attorney, Agent, or Firm*—Bo-In Lin

[57] ABSTRACT

This invention discloses a power supply unit for providing DC input to a portable electronic device which is operable with a rechargeable battery and an AC/DC adapter receiving power from an AC power source. The power supply unit includes a set of DC jacks of different sizes for connecting to the AC/DC adapters to receive a DC input voltage. The power supply unit further includes a backup battery pack for providing input voltage to the portable electronic device. The power supply unit further has a charging circuit for charging the rechargeable battery for the electronic device and the backup battery pack of the power supply unit.

20 Claims, 5 Drawing Sheets

PORTABLE POWER SUPPLY UNIT PROVIDING BACKUP BATTERY, BATTERY CHARGER, AND UNIVERSAL ADAPTER

BACKGROUND OF THE INVENTION

1. Field of the Invention

This invention relates generally to a direct current (DC) power supply for a portable electronic device such as a notebook computer. More particularly, this invention relates to a portable supply unit which provides a backup battery pack integrated with an enhanced battery charger and universal adapter for conveniently adopting to a wide variety of DC input jacks.

2. Description of the Prior Art

Continuous DC power supply when away from an AC power source for more than few hours often becomes a problem for a portable electronic device, e.g., a notebook computer or a personal digital assistant (PDA). Generally these type of devices have a built-in pocket for receiving a rechargeable battery pack as a primary power source when the device is being carried away for portable use. The rechargeable battery pack for portable operation can only last for few hours. Once the rechargeable battery pack is exhausted the electronic device has to be turned off. In order to continue its operation, a user can bring along a back-up battery pack which is identical in shape and design with the pack installed in the battery pack Once the first installed battery pack is discharged to a low level after few hours of operation, the backup battery pack can be installed to replace the first installed battery pack for continuous operation. However, before the battery replacement, depending on the nature of operation of the electronic device, the device may have to be turned off properly. In the case of a notebook computer, before it is turned off the files which the computer is executing must be properly closed and some files may have to be saved in order to preserve the works performed on the computer which may be lost either due to the total exhaustion of power supply or its improper turning off. This turning off and on processes generates interference and interruption to a computer user which is not only annoying but also decrease the user's effectiveness and productivity.

Operation with a portable electronic device and a conventional AC/DC adapter has another difficulty. There is a restriction that the installed battery pack is generally not being charged when the electronic device is in operation due to the fact that the input current is mostly used for supporting the operation of the electronic device. Thus, in order to charge a battery pack, the device usually has to be turned off. In the case of a slow charging either by a built-in charging circuit or the adapter, in order to fully charge the battery, the electronic device has to be temporarily out of service in the charging period. Again, the limitation of not able to efficiently and rapidly charging the battery pack reduce the usefulness and productivity of the portable electronic device such as a notebook computer.

Figure 1:
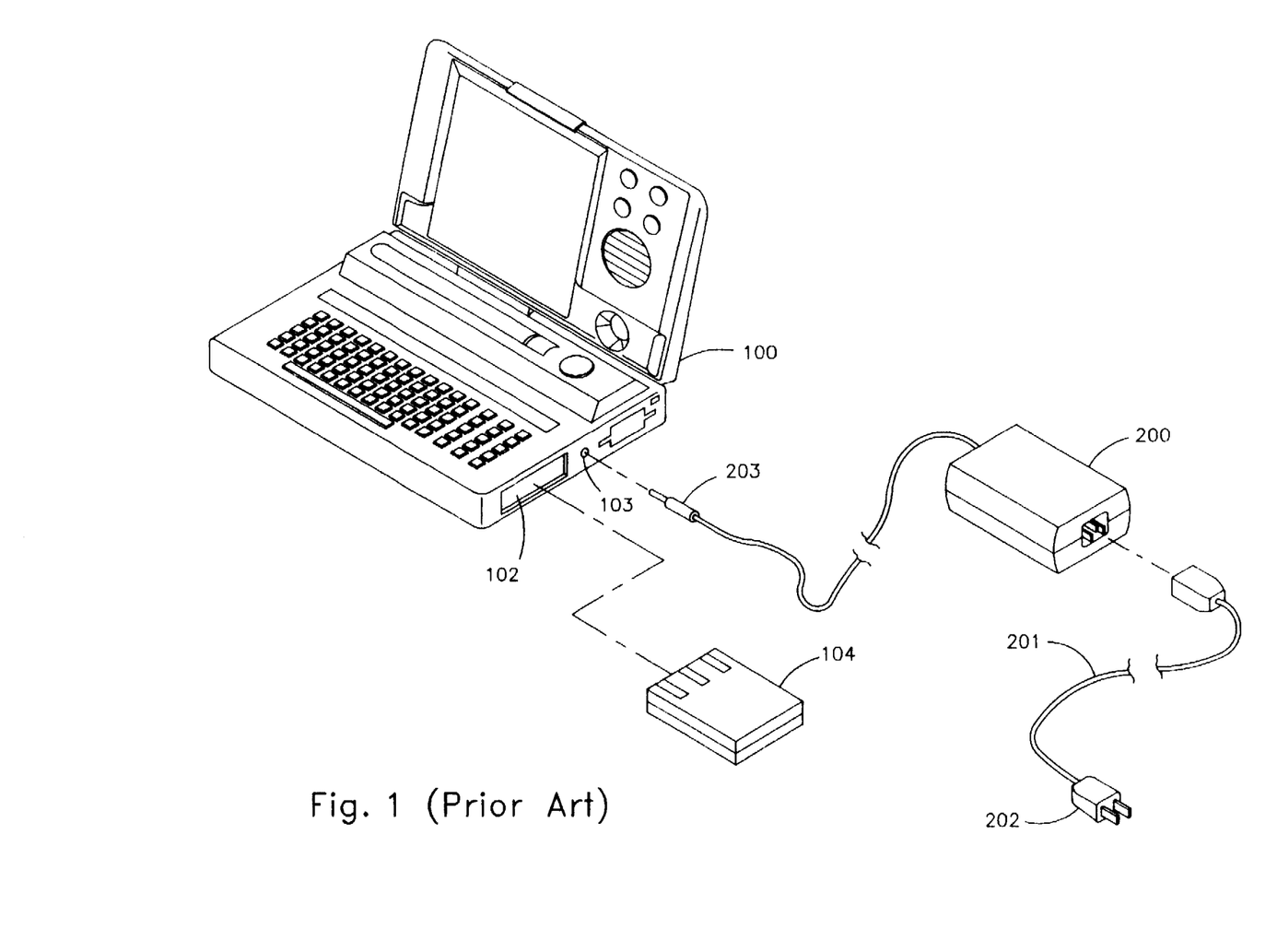
FIG. 1 is a perspective view of a prior art AC/DC power supply configuration employed by a portable notebook computer.

Referring now to FIG. 1 for a conventional power supply configuration of a notebook computer to illustrate these difficulties. A conventional notebook computer 100 is generally provided with two kinds of sources of DC current input The notebook 100 has a battery compartment 102 to receive a battery pack 104 to be installed therein to provide battery DC power. The notebook 100 further has a DC input pin socket 103 to receive a DC power from an AC/DC adapter 200 via a DC power plug 203 for plugging into the socket 103 on the notebook computer 100. The AC/DC adapter 200 is then connected via an electric cord 201 and an electric plug to an AC power outlet socket (not shown) for providing external power to the notebook computer 100.

The conventional power supply configuration as shown above has several drawbacks. As described above, the DC current provided by the AC/DC adapter 200 is also used to charge the installed battery. However, when the electronic device, e.g., the notebook computer, is turned on, the DC current is mostly applied for operation of the device due to the high load requirement demanded by the notebook computer 100. Thus the mounted battery 104 is not charged during operation. The mounted battery 104 can only be charged when the electronic device, e.g., the notebook computer 100 is not in operation by an external power source connected via the AC/DC adapter 200, the electric cord 201 and the electric plug 202. Some notebook computers are provided with special control means to control a specially designed AC/DC adapter 200 to control the operation and charging of the installed battery 104. However, the charging of the installed battery would stilled be limited by the charging capacity of the AC/DC adapter 200 which generally is designed to apply most of the input power to the operation of the notebook computer. Thus, charging of the installed battery often has to be performed when the notebook computer is not in operation. Furthermore, when the mounted battery 104 is exhausted, in order to continue the operation of the notebook by the use of a backup battery, the notebook must first be turned off by first saving the files which are being processed by the notebook computer 100 and then turn the computer 100 back on again after the backup battery is installed into the battery compartment 102. The productivity is decreased due to interruption of user's works on the computer 100 caused by the time consuming processes of battery installation with the saving of the processed files on the computer and the turning off and on the computer 100.

In this conventional power supply configuration, a user's option for selecting a backup battery is limited. The limitation is due to the fact that the backup battery has to be specifically made for installation in the battery compartment 102 in order to be used as replacement of the mounted battery pack 104. A user is thus limited to use a backup battery pack made with specific brands by specific manufacturers. Furthermore, in order to charge this specifically made backup battery pack, a user may have to carry a separate charger, otherwise, the backup battery pack has to be charged by inserting it into the battery compartment 102 and by turning off the notebook computer 100 while an external charging power is provided via the AC/DC adapter 200.

Brainard discloses in U.S. Pat. No. 5,371,456, entitled 'Power Supply and Battery Charging System' (issued on Dec. 6, 1994), a power charging apparatus for supplying electrical power to (a), an electrical device for operation, or to (b), a battery for charging or both. The power charging apparatus includes a primary power supply for supplying power from an external power source to the power charger, a power converter coupled to the primary power supply for converting the power received from the external power source into a form usable by the power charger, and a power controller coupled to the power converter for controlling the power applied to the device or the battery.

The main object of Brainard's apparatus is to maintain a constant charging current to the battery while allows the voltages across the device and battery to vary. Brainard's power supply and charging system may be useful to improve the battery-charging performance. However, since Brainard's apparatus does not include a battery, a user of a notebook computer is still required to bring a separate backup battery for longer term operation of the portable computer without external AC power source. Brainard's apparatus still does not provide a solution to the above difficulty that a user has to save all the files in use before replacing a backup battery when the first installed battery pack is about to exhaust the stored power. A user is also limited to bring a backup battery pack which is identical to the original battery pack provided by the notebook computer maker because this backup battery pack has to be installed into the battery packet provided in the electronic device before it can be used.

With the above limitations and difficulties, there is still a need in the art of power supply for portable electronic devices to design a new power supply configuration in order to resolve these difficulties and limitations. Specifically, this new power supply configuration must be able to provide to the user a universally adaptable backup battery pack and further as a battery charger with enhanced charging capacity for charging both the primary and the backup battery packs. Thus a user of the electronic devices is provided with the freedom that operation of the electronic device does not have to be interrupted when the first battery pack is about to exhaust Also, a backup battery can be universally adaptable to different models of electronic devices so that a user is not limited to use only certain types of backup battery packs due to the compatibility restrictions.

SUMMARY OF THE PRESENT INVENTION

It is therefore an object of the present invention to provide a new portable power supply unit for a portable electronic device by combining a backup battery pack with an improved battery charging circuit to achieve rapid charging, operational conveniences, and space saving, weight reduction in order to overcome the aforementioned difficulties encountered in the prior art.

Specifically, it is an object of the present invention to provide a new portable power supply unit for a portable electronic device by combining a backup battery pack with an improved battery charging circuit whereby the interruption in replacing a backup battery due to the requirement of removing the installed battery pack and installing the backup battery pack, i.e., a process of turning off and turning on device, can be eliminated;

Another object of the present invention is to provide a new portable power supply unit for a portable electronic device by combining a backup battery pack with an improved battery charging circuit whereby the backup battery and the installed battery can be separately charged and both the installed battery and the backup packs can be charged up rapidly.

Another object of the present invention is to provide a new portable power supply unit for a portable electronic device by combining a backup battery pack with an improved battery charging circuit which can be universally adaptable to different brands of a type of portable electronic devices thus an user is provided with a standard power supply unit for each type of electronic devices without requiring to carefully select a particular brand or model to assure compatibility.

Another object of the present invention is to provide a new portable power supply unit for a portable electronic device by combining a backup battery pack with an improved battery charging circuit wherein the primary and backup battery can be continuously charged either simultaneously or alternately by a single external power source without interruption whereby the productivity for an user may be increased.

Briefly, in a preferred embodiment, the present invention comprises a power supply apparatus for providing DC input to a portable electronic device. The electronic device is operable with a rechargeable battery and an AC/DC adapter receiving power from an AC power source. The power supply apparatus includes an universal interface means for connecting to the AC/DC adapter to receive a DC input voltage therefrom. The power supply apparatus further includes a backup battery pack for providing input voltage to the portable electronic device. The power supply apparatus further has a charging circuit for charging the rechargeable battery for the electronic device and the backup battery pack of the power supply apparatus.

It is an advantage of the present invention that it provides a new portable power supply unit for a portable electronic device by combining a backup battery pack with an improved battery charging circuit whereby the interruption in replacing a backup battery due to the requirement of removing the installed battery pack and installing the backup battery pack, i.e., a process of turning off and turning on device, can be eliminated.

Another advantage of the present invention is that it provides a new portable power supply unit for a portable electronic device by combining a backup battery pack with an improved battery charging circuit whereby the backup battery and the installed battery can be independently and separately charged and both the installed battery and the backup packs can be charged up rapidly.

Another advantage of the present invention is that it provides a new portable power supply unit for a portable electronic device by combining a backup battery pack with an improved battery charging circuit which can be universally adaptable to different brands of a type of portable electronic devices thus an user is provided with a standard power supply unit for each type of electronic devices without requiring to carefully select a particular brand or model to assure compatibility.

Another advantage of the present invention is that it provides a new portable power supply unit for a portable electronic device by combining a backup battery pack with an improved battery charging circuit wherein the primary and backup battery can be continuously charged either simultaneously or alternately by a single external power source without interruption whereby the productivity for an user may be increased.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
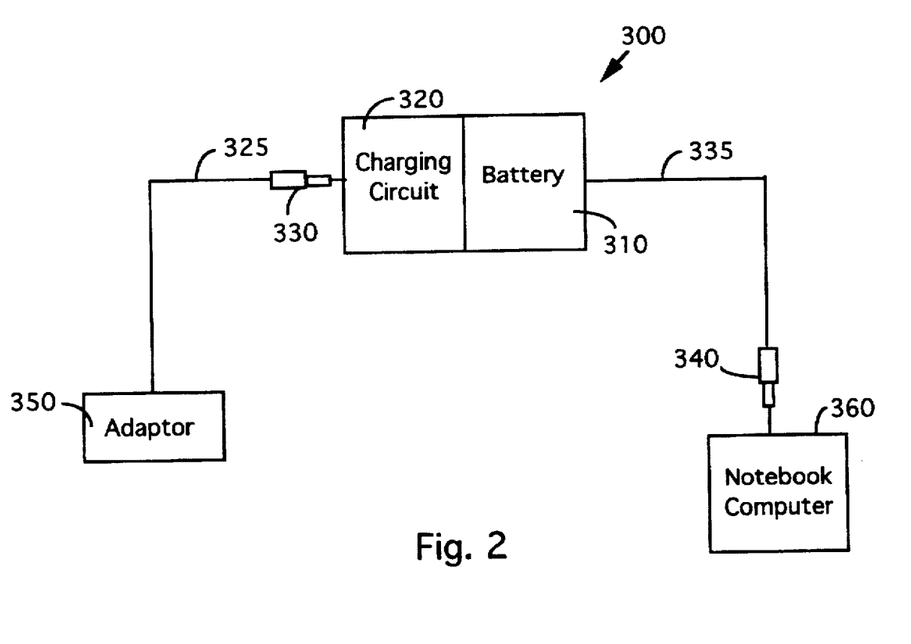
FIG. 2 is a functional block diagram for a power supply, i.e., a 'Two-in-One Walkpower', unit of the present invention.

FIG. 2 is a functional block diagram for a power supply unit 300 of the present invention which is a 'Two-in-One Walkpower' unit for receiving a DC input from a AC/DC adapter 350 to provide input DC voltage to a notebook computer 360. (Walkpower is a registered trademark of the Delta Green Energy Company). The power-supply unit 300, i.e., the 'Two-in-One Walkpower' unit, includes two major portions, i.e., a backup battery pack 310 and a charging circuit 320. The power supply unit 300 further includes an input line 325 for connecting to the AC/DC adapter 350 via an universal input interface means 330. The power supply unit 300 further includes an output line 335 to connect to the notebook computer 360 via an universal output interface means 340. The universal input interface means 330 provides a set of DC interface jacks to adapter such that one of these jacks can be compatible with a special type of AC/DC adapter 350. Similarly, the universal output interface means 340 provides a set of DC interface jacks to notebook computer such that one of these jacks can be compatible with a special type plug-in socket of a notebook.

Figures 3A, 3B:
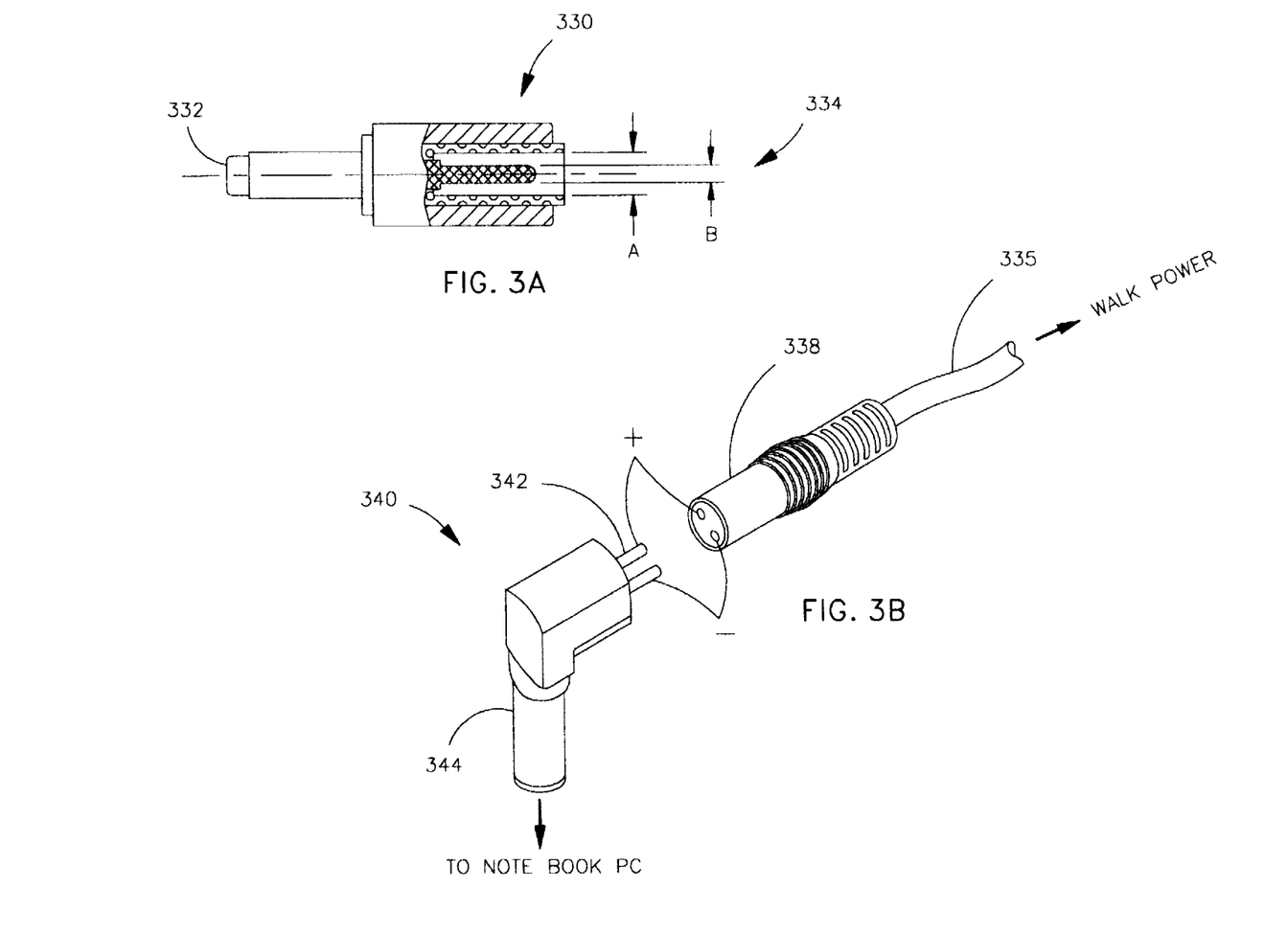
FIGS. 3A and 3B show the perspective views of universally adaptable interface input and output jacks as interface sets provided with the Walkpower unit.

FIG. 3A-1 shows one of input DC jacks 330 for adapter for compatible interface with different types of adapter DC jacks used by many types of AC/DC adapters. Each of these input jacks 330 has a standard D.C. plug 332 for plugging into the Walkpower 300. Each input jack 330 further has an adapter DC socket 334 for receiving an adapter plug therein. Each of these input jacks 330 has different sizes of adapter DC socket 334 with one of them fitting a specific adapter plug. These different sizes to fit different adopters for different brands of notebook computers are achieved by providing a set of adopters with a series of A and B sizes as shown in Table 1 below.

TABLE 1

| Dimension of DC Socket for Different Adapters | |
|---|---|
| Diameter A | Diameter B |
| 6.3 mm | 3.0 mm |
| 5.5 mm | 2.1 mm |
| 5.5 mm | 2.5 mm |
| 5.0 mm | 1.5 mm |
| 4.0 mm | 1.7 mm |

FIG. 3B shows one output jack 340 to plug into a notebook computer. The output cable from the Walkpower unit 335 is connected to an universal output socket 338 including a positive and a negative electrode holes to receive the output jack 340 which has a positive and negative electrodes 342. The output jack 340 further has a computer plug 344 to plug into a notebook computer. The positive and negative electrodes 342 are standardized to plug into the positive and negative electrode holes on the universal output socket 338. While, on the other end, the computer plug 344 is made with different sizes and shapes to plug into different computer DC sockets. Table 2 shows the dimensions of a set of computer plugs to be employed by this Walkpower unit 300 for providing power to different brands of notebook computers.

TABLE 2

| Dimension of Computer Plug | |
|---|---|
| Diameter of External Cylinder | Diameter of Internal Pin |
| 6.3 mm | 3.0 mm |
| 5.5 mm | 2.1 mm |
| 5.5 mm | 2.5 mm |
| 5.0 mm | 1.5 mm |
| 4.0 mm | 1.7 mm |

The present invention thus discloses a power supply apparatus 300 for providing DC input to a portable electronic device 360 operable with a rechargeable battery and an AC/DC adapter. The power supply apparatus 300 includes an universal adapter-interface 330 for connecting to the AC/DC adapter 350 to receive a DC input voltage therefrom. The power supply apparatus 300 further includes an universal device-interface 340 for connecting to the portable electronic device 360. The power supply apparatus 300 further includes a backup battery pack 310 for providing input voltage through the universal device interface 340 to the portable electronic device 360. The power supply apparatus 300 further includes a charging circuit 320 for charging the rechargeable battery 310 in the electronic device 360 and the backup battery pack 310 of the power supply apparatus 300.

Figure 4:
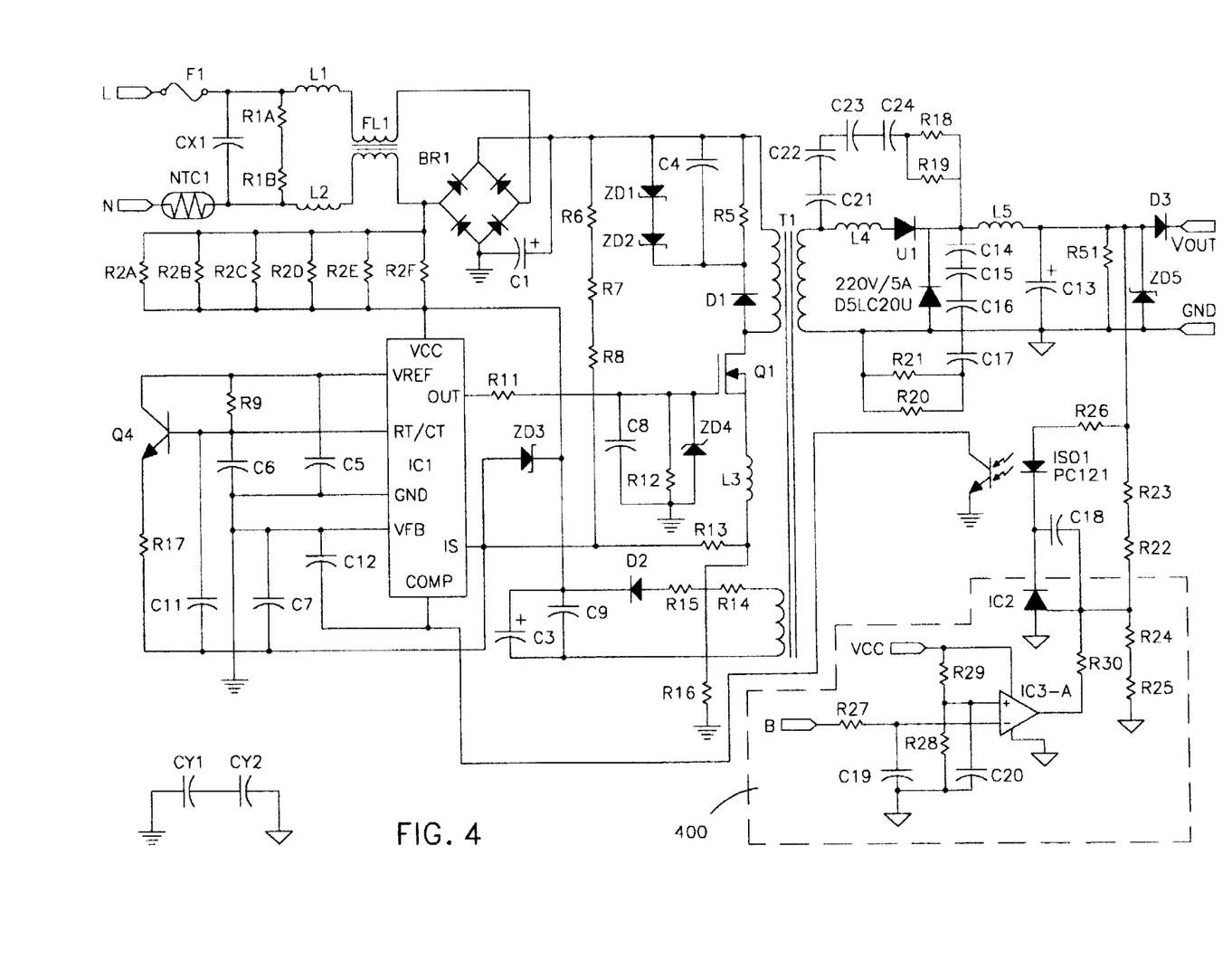
FIG. 4 shows the circuits of an improved battery charging system of the present invention.
Figure 5:
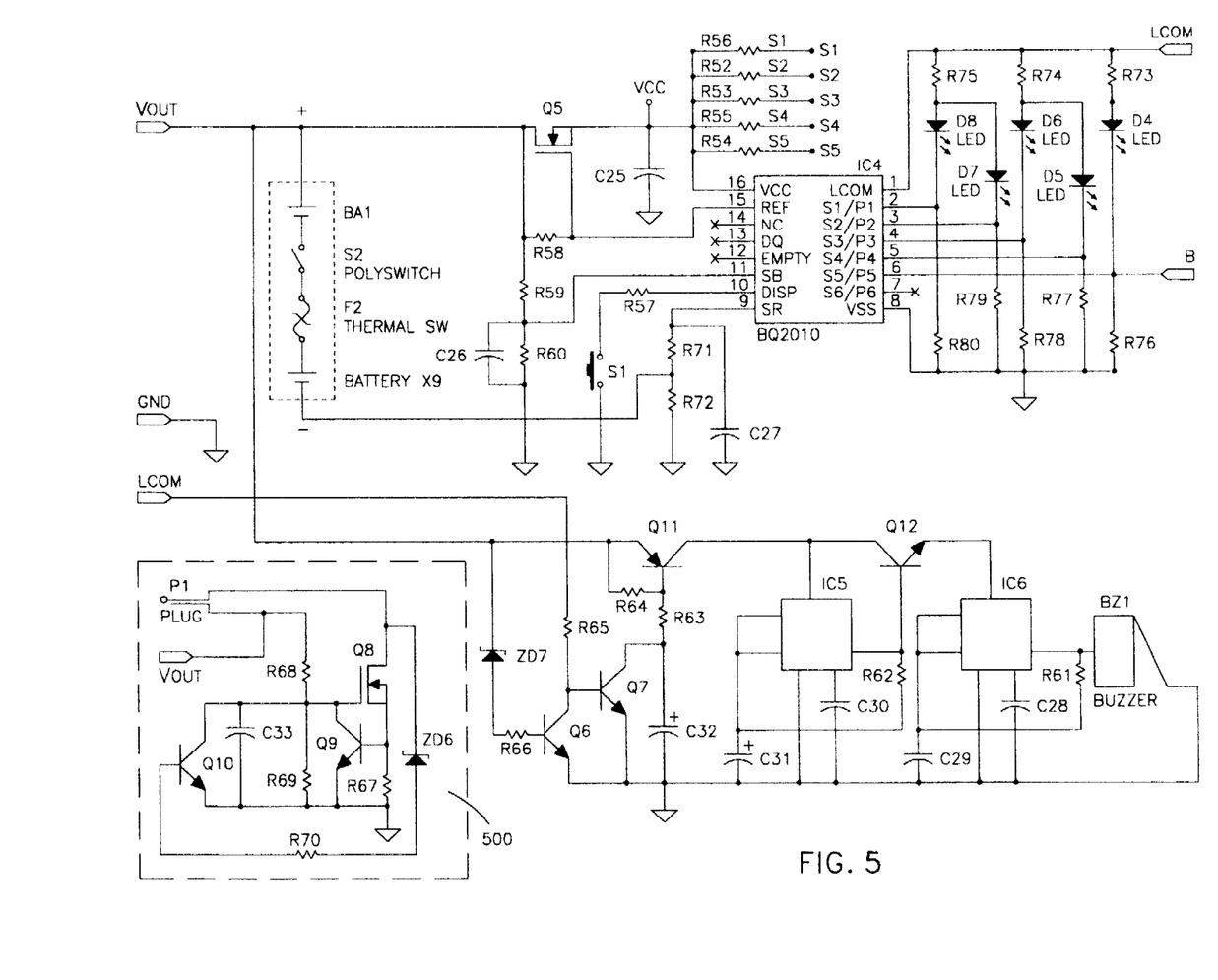
FIG. 5 shows the circuits of an output current regulator generated from the Walkpower unit for provide power input to a notebook computer.

FIGS. 4 and 5 are circuit diagrams showing an improved charging circuit and charging current regulator of the present invention. Please refer to a charging control block 400 in FIG. 4. When the Walkpower unit 300 is plugged into an AC power source and the backup battery pack 310 has a high charge state, i.e., five light emitting diodes (LEDs) including D4-LED, D5-LED, D6-LED, D7-LED, and D8-LED in FIG. 5 are all turned on, then point B is in a low voltage state. The output from a comparator IC3-A is in a high state. A resistor R30 is insulated from the ground voltage. The first input voltage to a transistor IC2 is thus elevated which causes a decrease of the input voltage from the power supply. A trickle charge to the backup battery pack 310 is initiated with the decrease input voltage from the power supply. The trickle charge state is maintained as long as these five LEDs are all turned on thus preventing the backup battery from being damaged due to overcharge with large charging current.

Conversely, when one of these five LEDs is off, the voltage at point B is at a high state which causes the output from the comparator IC3-4 to be in a low state. The resistor R30 is connected to a ground voltage. Thus, there is parallel connection between resistors R30 and R24 which in turn lowers the first input voltage to the transistor IC2 and causing an increase of the input voltage received from the power supply. The charging current is increased with higher input voltage to increase the charging rate to the backup battery pack 310. As soon as the backup battery pack 310 reaches a full charging state with five LEDs turned on, the voltage of the point B is switched to low and a trickle charge operation is then initiated. Working together with a charging state monitoring system including the LEDs, i.e., D4-LED to D8-LED in FIG. 5, to display the charging state of the backup battery pack, the control block 400 is employed to turning on and off alternately such that the charging circuit is operated to fast charge or tickle charge the backup battery pack 310 depending on the charging state of the battery pack 310.

Please refer to FIG. 5 for a current regulatory block 500. An output plug P1 is used to plug into an notebook computer 360. A pin 2 of the plug P1 is for adjusting the output voltage which is provided with an output voltage VOUT via a series connected resistor R68. A high state on R68 will cause a transistor Q8 to turn on, thus a current loop is formed through pins 2 and 3 of the transistor Q8 to provide power input via the output plug P1. A current passes through a resistor R67 also generates a voltage drop. When the current exceeds 2.5 amperes, the voltage drop on the resistor R67 will cause a transistor Q9 to turn on thus decreasing the voltage on a pin 1 of the transistor Q8. The current passes through the transistor Q8 is cut off as the voltage on pin 1 is decreased thus decreasing the output current flows to the notebook computer 360 via the output plug P1. Meanwhile, a decrease in the output loop current cause a lower voltage drop over the resistor R67 which in turn causes the transistor Q9 to turn off. The transistor Q8 is again being turned on and start to provide a normal charge current to the notebook computer 360. In case of a short circuit on the output plug P1, i.e., direct contact between legs 1 and 2 of the output plug P1, the voltage on the second pin of the transistor Q8 is be increased to VOUT which causes a Zenor Diode ZD6 to pass a current A transistor Q10 is turned on causing the voltage on pin 1 of Q8 to decrease thus cut off the current flowing through the transistor Q8 and cut off the output current to flow to the notebook computer 360. The current regulator 500 thus regulates the output current to the notebook computer within a pre-determined range. The current regulator block 500 also protects the notebook from being damaged due to short circuit by cutting off the output current through the output plug P1 when there is a short circuit occurs.

The Walkpower unit 300 can be universally adaptable for connection with many types of AC/DC adapter 350 and notebook computer 360. This universally adaptable power supply unit with a backup battery pack and charging circuit provide many operational advantages to an electronic device user. In the case of a notebook computer, a user is provided with a backup battery pack to directly supply a backup DC input voltage to the computer 360. When the installed battery pack in a notebook computer is exhausted, continuous power supply is provided by the back up battery pack 360. A user is not required to first save the files, shutoff the computer, then replace a backup battery pack by installing the backup battery into the regular battery pocket. Additionally, when an AC power source is available for a short time period, the backup battery pack 360 can be quickly charged independently while the notebook computer is operated without requiring to being a separate charger as what is required in a conventional backup battery configuration. Most importantly, a user of a certain brand of computer is no longer be limited to purchase only certain types of battery packs or battery chargers. This universally adaptable charger-backup battery unit, i.e., the Walkpower unit, is able to satisfy the power supply requirements for almost every kind of notebook computers. This universal adaptable configuration can be employed in many different kind of portable electronic devices operable with AC/DC adapter to provide more flexible arrangements to satisfy the DC power input requirements.

The present invention also discloses a method of providing an universal power supply apparatus 300 to a plurality of notebook computers each operable with a rechargeable battery and an AC/DC adapter 350. The method includes the steps of: (a) providing to the power supply apparatus 300 an universal adapter-interface 330 includes a set of DC jacks of plurality of sizes for compatibly connecting the power supply apparatus to a plurality of AC/DC adapters 350 to receive a DC input voltage therefrom; (b) providing to the power supply apparatus 300 an universal device-interface 340 includes a set of output jacks of plurality of sizes for compatibly connecting the power supply apparatus 300 to a plurality of notebook computers 360; (c) providing to the power supply apparatus 300 a backup battery pack 310 for providing input voltage through the universal device interface 340 to the notebook computer 360; and (d) providing to the power supply apparatus a charging circuit 320 for charging the rechargeable battery in the notebook computer 360 and the backup battery pack 310 of the power supply apparatus 300. In another preferred embodiment, the method of the present invention further comprising the steps of: (e) providing to the power supply apparatus 300 a backup battery monitoring and display means, i.e., the D4-LED to D8-LED, for continuously monitoring a charge capacity of the backup battery pack 310 and for displaying the charge capacity. In another preferred embodiment, the method of providing an universal power supply apparatus further comprises the steps of: (f) providing to the power supply apparatus 300 a charging current control circuit 400 for receiving a voltage signal from the backup battery monitoring and display means, i.e., the D4-LED to D8-LED, for controlling an amount of a charging current from the charging circuit for charging the backup battery; and (g) providing to the power supply apparatus 300 an output current regulating circuit 500 for controlling an output DC current generating from the power supply apparatus 300 for output to the notebook computer 360.

The present invention discloses a new and non-obvious portable power supply unit for a portable electronic device by combining a backup battery pack with an improved battery charging circuit to achieve rapid charging, operational conveniences, and space saving, weight reduction in order to overcome the difficulties encountered in the prior art. Specifically, the present invention provides a new portable power supply unit for a portable electronic device by combining a backup battery pack with an improved battery charging circuit whereby the interruption in replacing a backup battery due to the requirement of removing the installed battery pack and installing the backup battery pack, i.e., a process of turning off and turning on device, can be eliminated. The backup battery and the installed battery can be separately charged and both the installed battery and the backup packs can be charged up rapidly. Furthermore, the power supply unit can be universally adaptable to different brands of a type of portable electronic devices thus an user is provided with a standard power supply unit for each type of electronic devices without requiring to carefully select a particular brand or model to assure compatibility. By employing this power supply unit, the primary and backup battery can be continuously charged either simultaneously or alternately by a single external power source without interruption whereby the productivity for an user may be increased.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A backup power source apparatus for compatibly providing DC input to a plurality of different types of portable electronic devices operable with a rechargeable battery and different types of AC/DC adapter, said power supply apparatus comprising:
- an universal adapter-interface for compatibly connecting to each of said different types of AC/DC adapters designed for one of said plurality of different electronic devices to receive a DC input voltage therefrom;
- an universal device-interface for compatibly connecting to one of said plurality of different types of portable electronic devices;
- a backup battery pack for providing input voltage through said universal device interface to one of said plurality of portable electronic devices;
- a charging circuit for charging said rechargeable battery in one of said plurality of portable electronic devices and said backup battery pack of said power supply apparatus.

2. The backup power source apparatus of claim 1 further comprising:
- a backup battery monitoring and display means for continuously monitoring a charge capacity of said backup battery pack and for displaying said charge capacity.

3. The backup power source apparatus of claim 2 further comprising:
- a charging current control circuit for receiving a voltage signal from said backup battery monitoring and display means for controlling an amount of a charging current from said charging circuit for charging said backup battery.

4. The backup power source apparatus of claim 1 further comprising:
- an output current regulating circuit for controlling an output DC current generating from said power supply apparatus for output to one of said plurality of portable electronic devices.

5. The backup power source apparatus of claim 1 wherein:
- said universal adapter-interface for connecting to said AC/DC adapter includes a set of DC jacks of plurality of sizes for compatibly connecting said power supply apparatus to a plurality of different types of adapters each being designed for one of said plurality of different types of AC/DC adapters; and
- said universal device-interface for connecting to said portable electronic device includes a set of output jacks of plurality of sizes for compatibly connecting said power supply apparatus to one of said plurality of different types of portable electronic devices.

6. A backup power source for compatibly providing DC input to a plurality of different types of portable electronic devices operable with a plurality of different types of rechargeable battery and an AC/DC adapters, said backup power source apparatus comprising:
- an universal adapter-interface includes a set of DC jacks of plurality of sizes for compatibly connecting said backup power source apparatus to a plurality of different types of AC/DC adapters each designed for one of said plurality of different types of electronic devices to receive a DC input voltage therefrom;
- an universal device-interface includes a set of output jacks of plurality of sizes for compatibly connecting said backup power source apparatus to one of a plurality of different types of portable electronic devices;
- a backup battery pack for providing input voltage through said universal device interface to one of said plurality of portable electronic devices;
- a charging circuit for charging said rechargeable battery in said electronic device and said backup battery pack of said backup power source apparatus;
- a backup battery monitoring and display means for continuously monitoring a charge capacity of said backup battery pack and for displaying said charge capacity;
- a charging current control circuit for receiving a voltage signal from said backup battery monitoring and display means for controlling an amount of a charging current from said charging circuit for charging said backup battery; and
- an output current regulating circuit for controlling an output DC current generating from said backup power source apparatus for output to said portable electronic devices.

7. A backup power source apparatus for providing DC input to different types of notebook computers operable with different types of rechargeable battery and different types of AC/DC adapters, said backup power source apparatus comprising:
- an universal adapter-interface includes a set of DC jacks of plurality of sizes for compatibly connecting said backup power source apparatus to said plurality of different types of AC/DC adapters to receive a DC input voltage therefrom;
- an universal device-interface includes a set of output jacks of plurality of sizes for compatibly connecting said backup power source apparatus to said plurality of different types of notebook computers;
- a backup battery pack for providing input voltage through said universal device interface to said different notebook computers;
- a charging circuit for charging said rechargeable battery in said notebook computer and said backup battery pack of backup power source apparatus;
- a backup battery monitoring and display means for continuously monitoring a charge capacity of said backup battery pack and for displaying said charge capacity;
- a charging current control circuit for receiving a voltage signal from said backup battery monitoring and display means for controlling an amount of a charging current from said charging circuit for charging said backup battery; and
- an output current regulating circuit for controlling an output DC current generating from said-backup power source apparatus for output to said different types of notebook computers.

8. A method of compatibly providing a backup power source apparatus to a plurality of different types of notebook computers each operable with a different type of rechargeable battery and a different type of AC/DC adapter, the method comprising the steps of:
- (a) providing to said backup power source apparatus an universal adapter-interface includes a set of DC jacks of plurality of sizes for compatibly connecting said backup power source apparatus to a plurality of different types of AC/DC adapters each designed for one of said plurality of different types of notebook computers to receive a DC input voltage therefrom;
- (b) providing to said backup power source apparatus an universal device-interface includes a set of output jacks of plurality of sizes for compatibly connecting backup power source apparatus to one of said plurality of different types of notebook computers;
- (c) providing to said backup power source apparatus a backup battery pack for providing input voltage through said universal device interface to said different notebook computers; and (d) providing to said backup power source apparatus a charging circuit for charging said rechargeable battery in said notebook computer and said backup battery pack of backup power source apparatus.

9. The method of compatibly providing said backup power source apparatus of claim 8 further comprising the steps of:

(e) providing to said backup power source apparatus a backup battery monitoring and display means for continuously monitoring a charge capacity of said backup battery pack and for displaying said charge capacity.

10. The method of compatibly providing an backup power source apparatus of claim 9 further comprising the steps of:

(f) providing to said backup power source apparatus a charging current control circuit for receiving a voltage signal from said backup battery monitoring and display means for controlling an amount of a charging current from said charging circuit for charging said backup battery; and (g) providing to said backup power source apparatus an output current regulating circuit for controlling an output DC current generating from backup power source apparatus for output to said different notebook computers.

11. A backup power source apparatus for compatibly providing DC input to a plurality of different portable electronic devices operable with a rechargeable battery and an AC/DC adapter, said power source apparatus comprising:

an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided with a set of standard DC-jack outer and inner diameters provided for plugging into each of different types of AC/DC adapter cables;

an universal device-interface includes a set of output jacks of plurality of sizes for compatibly connecting said power source apparatus to a plurality of portable electronic devices wherein each of said set of output jacks including a first end for plugging into said backup power source apparatus and a second end for plugging into said portable electronic devices having a external cylinder and an internal pin with diameters specifically provided with a set of standard output-jack external cylinder and internal pin dimensions for plugging into each of said different types of portable electronic devices;

a backup battery pack for providing input voltage through said universal device interface to said portable electronic device;

a charging circuit for charging said rechargeable battery in said electronic device and said backup battery pack of said power source apparatus;

a backup battery monitoring and display means for continuously monitoring a charge capacity of said backup battery pack and for displaying said charge capacity;

a charging current control circuit for receiving a voltage signal from said backup battery monitoring and display means for controlling an amount of a charging current from said charging circuit for charging said backup battery; and an output current regulating circuit for controlling an output DC current generating from said power source apparatus for output to said portable electronic device.

12. A backup power source apparatus for compatibly providing DC input to a plurality of different notebook computers operable with a rechargeable battery and an AC/DC adapter, said power source apparatus comprising:

an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided with a set of standard DC-jack outer and inner diameters provided for plugging into each of different types of AC/DC adapter cables;

an universal notebook computer-interface includes a set of output jacks of plurality of sizes for compatibly connecting said power source apparatus to a plurality of notebook computers wherein each of said set of output jacks including a first end for plugging into said backup power source apparatus and a second end for plugging into a plurality of different notebook computers having an external cylinder and an internal pin with diameters specifically provided with a set of standard output-jack external cylinder and internal pin dimensions for plugging into each of said different types of notebook computers;

a backup battery pack for providing input voltage through said universal device interface to said notebook computer;

a charging circuit for charging said rechargeable battery in said notebook computer and said backup battery pack of said power source apparatus;

a backup battery monitoring and display means for continuously monitoring a charge capacity of said backup battery pack and for displaying said charge capacity;

a charging current control circuit for receiving a voltage signal from said backup battery monitoring and display means for controlling an amount of a charging current from said charging circuit for charging said backup battery; and an output current regulating circuit for controlling an output DC current generating from said power source apparatus for output to said notebook computer.

13. A backup power source apparatus for compatibly providing DC input to a plurality of different portable electronic devices operable with a rechargeable battery and an AC/DC adapter, said power source apparatus comprising:

an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer diameter A and an inner diameter B where A and B are specially provided according to a set of industrial standard provided for plugging into each of different types of AC/DC adapter cables;

an universal device-interface includes a set of output jacks of plurality of sizes for compatibly connecting said power source apparatus to a plurality of portable electronic devices wherein each of said set of output jacks including a first end for plugging into said backup power source apparatus and a second end for plugging into a plurality of different electronic devices having an external cylinder and an internal pin with diameters specifically provided according to a set of industrial standard for plugging into each of said different types of portable electronic devices;

a backup battery pack for providing input voltage through said universal device interface to said portable electronic device; and a charging circuit for charging said rechargeable battery in said electronic device and said backup battery pack of said power source apparatus;

a backup battery monitoring and display means for continuously monitoring a charge capacity of said backup battery pack and for displaying said charge capacity;

a charging current control circuit for receiving a voltage signal from said backup battery monitoring and display means for controlling an amount of a charging current from said charging circuit for charging said backup battery; and an output current regulating circuit for controlling an output DC current generating from said power source apparatus for output to said portable electronic device.

14. A backup power source apparatus for providing DC input compatible to a plurality of different notebook computer operable with a rechargeable battery and an AC/DC adapter, said power source apparatus comprising:

an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer diameter A and an inner diameter B where A and B are specially provided according to a set of industrial standard provided for plugging into each of different types of AC/DC adapter cables;

an universal device-interface includes a set of output jacks of plurality of sizes for compatibly connecting said power source apparatus to a plurality of notebook computers wherein each of said set of output jacks including a first end for plugging into said backup power source apparatus and a second end for plugging into a plurality of different notebook computers having an external cylinder and an internal pin with diameters specifically provided according to a set of industrial standard for plugging into each of said different types of notebook computers;

a backup battery pack for providing input voltage through said universal device interface to said notebook computer;

a charging circuit for charging said rechargeable battery in said notebook computer and said backup battery pack of said power source apparatus;

a backup battery monitoring and display means for continuously monitoring a charge capacity of said backup battery pack and for displaying said charge capacity;

a charging current control circuit for receiving a voltage signal from said backup battery monitoring and display means for controlling an amount of a charging current from said charging circuit for charging said backup battery; and an output current regulating circuit for controlling an output DC current generating from said power source apparatus for output to said notebook computer.

15. A method of compatibly providing an universal backup power source apparatus to a plurality of different notebook computers each operable with a rechargeable battery and an AC/DC adapter, the method comprising the steps of:

(a) providing to said power source apparatus an universal adapter interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided with a set of standard DC-jack outer and inner diameters provided for plugging into each of different types of AC/DC adapter cables;

(b) providing to said power source apparatus an universal device interface includes a set of output jacks of plurality of sizes for compatibly connecting said power source apparatus to a plurality of notebook computers wherein each of said set of output jacks including a first end for plugging into said backup power source apparatus and a second end for plugging into a plurality of different notebook computers, said jacks having an external cylinder and an internal pin with diameters specifically provided with a set of standard output-jack external cylinder and internal pin dimensions for plugging into each of said different types of portable electronic devices;

(c) providing to said power source apparatus a backup battery pack for providing input voltage through said universal device interface to said notebook computer; and (d) providing to said power source apparatus a charging circuit for charging said rechargeable battery in said notebook computer and said backup battery pack of said power source apparatus.

16. A method of compatibly providing an universal backup power source apparatus to a plurality of different notebook computers each operable with a rechargeable battery and an AC/DC adapter, the method comprising the steps of:

(a) providing to said power source apparatus an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided according to an industrial standard provided for plugging into each of different types of AC/DC adapter cables;

(b) providing to said power source apparatus an universal device-interface includes a set of output jacks of plurality of sizes for compatibly connecting said power source apparatus to a plurality of notebook computers wherein each of said set of output jacks including a first end for plugging into said backup power source apparatus and a second end for plugging into a plurality of different notebook computers having an external cylinder and an internal pin with diameters specifically provided according to a set of industrial standard for plugging into each of said different types of notebook computers;

(c) providing to said power source apparatus a backup battery pack for providing input voltage through said universal device interface to said notebook computer; and (d) providing to said power source apparatus a charging circuit for charging said rechargeable battery in said notebook computer and said backup battery pack of said power source apparatus.

17. A method of compatibly providing an universal backup power source apparatus to a plurality of different electronic devices each operable with a rechargeable battery and an AC/DC adapter, the method comprising the steps of:

(a) providing to said power source apparatus an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided with a set of standard DC-jack outer and inner diameters provided for plugging into each of different types of AC/DC adapter cables;

(b) providing to said power source apparatus an universal device-interface includes a set of output jacks of plurality of sizes for compatibly connecting said power source apparatus to a plurality of electronic devices wherein each of said set of output jacks including a first end for plugging into said backup power source apparatus and a second end for plugging into a plurality of different electronic devices, said jacks having an external cylinder and an internal pin with diameters specifically provided with a set of standard output-jack external cylinder and internal pin dimensions for plugging into each of said different types of said portable electronic devices;

(c) providing to said power source apparatus a backup battery pack for providing input voltage through said universal device interface to said electronic devices; and (d) providing to said power source apparatus a charging circuit for charging said rechargeable battery in said electronic devices and said backup battery pack of said power source apparatus.

18. A method of compatibly providing an universal backup power source apparatus to a plurality of different electronic devices each operable with a rechargeable battery and an AC/DC adapter, the method comprising the steps of:

(a) providing to said power source apparatus an universal adapter-interface includes a set of DC jacks of plurality of sizes for compatibly connecting said power source apparatus to a plurality of AC/DC adapters to receive a DC input voltage therefrom wherein each jack of said set of DC jacks including a first end for plugging into said backup power source apparatus and a second ending having an outer A diameter and an inner diameter B where A and B are specially provided according to an industrial standard provided for plugging into each of different types of AC/DC adapter cables;

(b) providing to said power source apparatus an universal device-interface includes a set of output jacks of plurality of sizes for compatibly connecting said power source apparatus to a plurality of electronic devices wherein each of said set of output jacks including a first end for plugging into said backup power source apparatus and a second end for plugging into a plurality of different electronic devices having an external cylinder and an internal pin with diameters specifically provided according to a set of industrial standard for plugging into each of said different types of portable electronic devices;

(c) providing to said power source apparatus a backup battery pack for providing input voltage through said universal device interface to said electronic devices; and (d) providing to said power source apparatus a charging circuit for charging said rechargeable battery in said electronic devices and said backup battery pack of said power source apparatus.

19. The method of providing an universal power source apparatus of claim 18 further comprising the steps of:

(e) providing to said power source apparatus a backup battery monitoring and display means for continuously monitoring a charge capacity of said backup battery pack and for displaying said charge capacity.

20. The method of providing an universal power source apparatus of claim 19 further comprising the steps of:

(f) providing to said power source apparatus a charging current control circuit for receiving a voltage signal from said backup battery monitoring and display means for controlling an amount of a charging current from said charging circuit for charging said backup battery; and (g) providing to said power source apparatus an output current regulating circuit for controlling an output DC current generating from said power source apparatus for output to said electronic devices.

* * * * *